US011182597B2

(12) United States Patent
Najafirad et al.

(10) Patent No.: US 11,182,597 B2
(45) Date of Patent: Nov. 23, 2021

(54) SYSTEMS AND METHODS FOR EVALUATING INDIVIDUAL, GROUP, AND CROWD EMOTION ENGAGEMENT AND ATTENTION

(71) Applicant: BOARD OF REGENTS, THE UNIVERSITY OF TEXAS SYSTEM, Austin, TX (US)

(72) Inventors: Peyman Najafirad, San Antonio, TX (US); Arun Das, San Antonio, TX (US)

(73) Assignee: Board of Regents, The University of Texas Systems, Austin, TX (US)

( * ) Notice: Subject to any disclaimer, the term of this patent is extended or adjusted under 35 U.S.C. 154(b) by 0 days.

(21) Appl. No.: 16/251,768

(22) Filed: Jan. 18, 2019

(65) Prior Publication Data
US 2019/0228215 A1    Jul. 25, 2019

Related U.S. Application Data

(60) Provisional application No. 62/619,214, filed on Jan. 19, 2018.

(51) Int. Cl.
*G06K 9/00* (2006.01)
*G06T 7/20* (2017.01)
(Continued)

(52) U.S. Cl.
CPC ......... *G06K 9/00335* (2013.01); *G06F 3/012* (2013.01); *G06F 3/013* (2013.01); *G06K 9/00268* (2013.01); *G06K 9/00302* (2013.01); *G06N 20/00* (2019.01); *G06T 7/20* (2013.01); *G06F 2203/011* (2013.01);
(Continued)

(58) Field of Classification Search
CPC ........... G06K 9/00335; G06K 9/00268; G06K 9/00302; G06K 9/6271; G06K 9/00261; G06N 20/00; G06N 3/0445; G06N 3/0454; G06N 3/084; G06N 3/0481; G06T 7/20; G06T 2207/20081; G06T 2207/30201; G06T 2207/30241; G06F 3/013; G06F 3/012; G06F 2203/011
See application file for complete search history.

(56) References Cited

U.S. PATENT DOCUMENTS 8,219,438 B1   7/2012 Moon et al.
8,401,248 B1*  3/2013 Moon ................ G06K 9/00597
                                                  382/118

(Continued)

OTHER PUBLICATIONS

International Search Report and Written Opinion dated Mar. 27, 2019; 14 pages, PCT/US19/14228.

(Continued)

*Primary Examiner* — Aaron W Carter
(74) *Attorney, Agent, or Firm* — Smith, Gambrell & Russell LLP

(57) ABSTRACT

Evaluating the engagement and attentiveness of persons in a group by preparing a streaming video of the group, extracting faces of the persons in the group, aligning the extracted faces, assigning an identity to each of the faces, recognizing the emotional state of each face by a temporal emotion recognition module, and estimating the attentiveness of each person based on the recognized emotional state of each face of each person. The estimated attentiveness may also include recognizing the gaze of each person.

7 Claims, 7 Drawing Sheets

(51) Int. Cl.
*G06F 3/01* (2006.01)
*G06N 20/00* (2019.01)

(52) U.S. Cl.
CPC ............... *G06T 2207/10016* (2013.01); *G06T 2207/20081* (2013.01); *G06T 2207/30201* (2013.01); *G06T 2207/30241* (2013.01)

(56) References Cited

U.S. PATENT DOCUMENTS

| | | | | |
|---|---|---|---|---|
| 9,812,151 | B1* | 11/2017 | Amini | G10L 15/26 |
| 9,928,406 | B2* | 3/2018 | Bhanu | G06K 9/00315 |
| 10,915,798 | B1* | 2/2021 | Zhang | G06K 9/623 |
| 2005/0147291 | A1* | 7/2005 | Huang | G06K 9/00288 |
| | | | | 382/159 |
| 2009/0285456 | A1* | 11/2009 | Moon | G06K 9/00335 |
| | | | | 382/118 |
| 2010/0086215 | A1* | 4/2010 | Bartlett | G06K 9/00288 |
| | | | | 382/197 |
| 2011/0263946 | A1* | 10/2011 | el Kaliouby | G06K 9/00335 |
| | | | | 600/300 |
| 2013/0094722 | A1* | 4/2013 | Hill | G06K 9/00302 |
| | | | | 382/118 |
| 2014/0049546 | A1* | 2/2014 | Wang | G06K 9/46 |
| | | | | 345/441 |
| 2014/0316881 | A1* | 10/2014 | Movellan | G06K 9/00315 |
| | | | | 705/14.42 |
| 2015/0332118 | A1* | 11/2015 | Wang | G06K 9/00684 |
| | | | | 382/203 |
| 2016/0078279 | A1* | 3/2016 | Pitre | A61B 5/165 |
| | | | | 382/118 |
| 2017/0032505 | A1 | 2/2017 | Levieux | |
| 2017/0098122 | A1* | 4/2017 | Kaliouby | G16H 50/30 |
| 2017/0109571 | A1* | 4/2017 | McDuff | A61B 5/0077 |
| 2017/0193286 | A1* | 7/2017 | Zhou | G06K 9/00281 |
| 2017/0330029 | A1 | 11/2017 | Turcot et al. | |
| 2018/0114056 | A1* | 4/2018 | Wang | G06K 9/00295 |
| 2018/0330152 | A1* | 11/2018 | Mittelstaedt | G06K 9/00261 |
| 2019/0034706 | A1* | 1/2019 | el Kaliouby | G06T 7/73 |
| 2019/0122071 | A1* | 4/2019 | Jin | G06K 9/00302 |
| 2019/0122072 | A1* | 4/2019 | Crier | G06K 9/6277 |
| 2019/0172243 | A1* | 6/2019 | Mishra | G06K 9/6256 |
| 2019/0172458 | A1* | 6/2019 | Mishra | G10L 15/005 |
| 2019/0205626 | A1* | 7/2019 | Kim | G06K 9/00228 |
| 2019/0228215 | A1* | 7/2019 | Najafirad | G06N 20/00 |
| 2019/0294868 | A1* | 9/2019 | Martinez | G06K 9/00281 |
| 2019/0347476 | A1* | 11/2019 | Jo | G06N 3/04 |
| 2020/0210688 | A1* | 7/2020 | Xu | G06K 9/00281 |
| 2020/0219295 | A1* | 7/2020 | el Kaliouby | G06K 9/00288 |
| 2020/0275873 | A1* | 9/2020 | Xu | A61B 5/1172 |
| 2021/0000404 | A1* | 1/2021 | Wang | A61B 5/117 |

OTHER PUBLICATIONS

Excerpt from Ekman, P. et al., "Emotions in the Human Face: Chapter XIV: What Emotion Dimensions Can Observers Judge from Facial behavior?", Cambridge University Press, pp. 67, 75 [1982].

Excerpts from Darwin, C. et al., "The Expression of Emotion in Man and Animals: Introduction," Oxford University Press, p. 11 [1998].

Excerpts from Darwin, C. et al., "The Expression of Emotion in Man and Animals: The principle of serviceable associated habits," Oxford University Press, p. 23 [1998].

Excerpts from Darwin, C. et al., "The Expression of Emotion in Man and Animals: The principle of the direct action of the nervous system," Oxford University Press, p. 45 [1998].

* cited by examiner

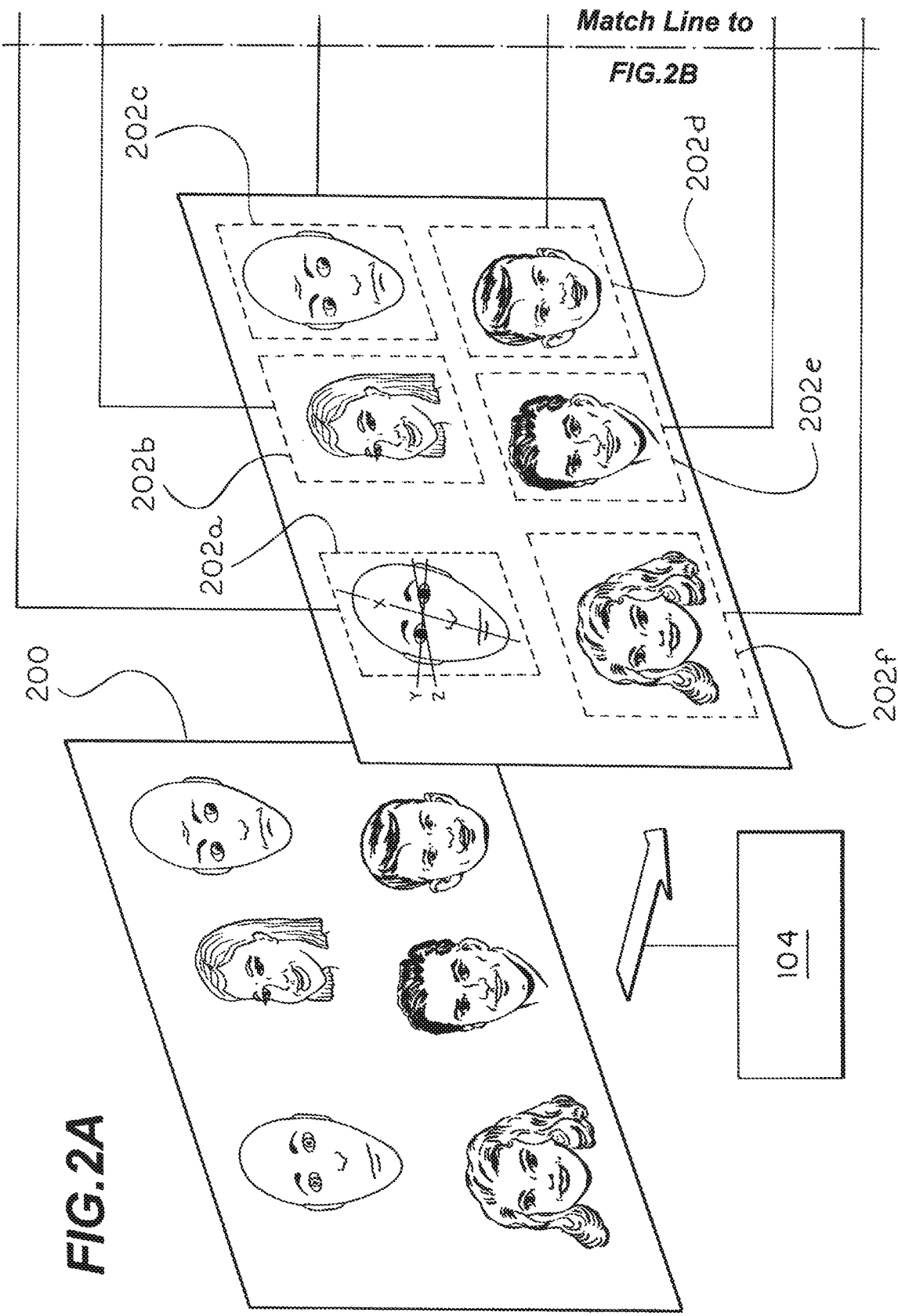

SYSTEMS AND METHODS FOR EVALUATING INDIVIDUAL, GROUP, AND CROWD EMOTION ENGAGEMENT AND ATTENTION

FIELD OF INVENTION

This application relates to systems and methods for detecting emotion engagement of a group of people doing certain tasks based on visual information streamed from video recording devices over Internet or local networks. The system can be deployed on cloud computing backend as well as mobile and edge devices. The system has particular applicability to such applications as virtual meetings, e-learning, classrooms, shopping, retail, e-commerce, etc.

BACKGROUND

Machine Learning (ML) focuses on training intelligent systems capable of learning patterns of data without being explicitly programmed. Deep Learning (DL), a subset of Machine Learning powered Artificial Intelligence (AI) domain, can train complex neural network systems to gain enormous insights from various data sources such as audio, video, text, etc. Computer-vision based DL systems operate on video and image data such as images of objects, frontal facial images, retina fundus images, etc. to train classifiers for specific tasks such as object detection, face identification, emotion classification, disease classification, etc. With the advances in technology, there is an imperative shift in the way we set up meetings, learn in classrooms and engage with other people. The use of technology in all aspects of life and the usage of handheld and portable devices are changing the way we interact with both computers and fellow humans alike.

It is often important, as a consumer and producer of information and as a social animal, to evaluate the engagement of others in a large group on certain tasks such as listening from lectures, meetings, etc. as the attention span of people vary widely. Therefore, a non-interactive method of extracting behavioral patterns, attention span, excitement, and engagement could help interpret whether a group of people paid attention to the events and gained any insights from them. This system can be used to assess qualitative and quantitative measures in sharing and receiving information in a group. Temporal information on the attentiveness on a per-user basis as well as of the group can be used to infer points of interest thereby help design novel interactive teaching methods, personalized exercise recommendations to students, better resource sharing, efficiency in meetings, etc.

Emotions play a crucial role in human lives, being functionally adaptive in our evolutionary history and assisting individual survival. Humans are rapid information-processing organisms that use emotion detection to make quick decisions about whether to defend, attack, care for others, escape, reject food, or approach something useful. Emotions, therefore, not only influence immediate actions but also serve as an important motivational basis for future behaviors. Emotions are expressed both verbally through words and nonverbally through facial expressions, voices, gestures, body postures, and movements. Emotions communicate information about our feelings, intentions, and relationships when interacting with others. Therefore, emotions have signal value to others and influence others and our social interactions. In general, as described in "The Expression of Emotion In Man And Animals," published in Oxford University Press by Charles Darwin and Philip Prodger [1998], emotion expressions are evolved, adaptive, and not only serve as part of an emotion mechanism that protects the organism or prepares it for action, but also have significant communicative functionality.

Facial Expression (FE) research gained momentum with Darwin's theory that proved expressions are universal. Later, FEs were categorized into a set of six emotions. Paul Ekman with his collaborators and Izard provided cross-cultural studies and proposed the universality in interpreting of emotion by facial expression. Ekman et al. published their findings in Journal of Personality and Social Psychology [1971], "Constants across Cultures in the Face and Emotion," pages 124-129. Furthermore, Ekman and his team developed objective measures of facial expression named the Facial Action Coding System (FACS) published their findings in "Facial Action Coding System," Consulting Psychologists Press, Inc., Palo Alto, Calif. in 1978. Several theories have been proposed by Ekman for emotion. Among them, the dimension approach argues that emotions are not discrete and separate, but are better measured as differing only in degree of one or another dimension. The findings were published in a Cambridge University Press publication, "Emotion in the Human Face" by Ekman et al. [1982]. Dimension theory has proposed that different emotions are linked to relatively distinct patterns of automatic nervous system activity. Micro-Expression (ME) is a very transitory, automatic reflex of FE according to experienced emotions. ME may occur in high-stake situations when people attempt to conceal or cover their actual mindsets. This organizes the connection between facial expression and automatic physiology. Studies of the central nervous system correlates that facial expressions also bear upon the dimensionality versus discrete issue. Discrete emotions theorists have argued that the experience and perception of different facial expressions of emotion involve distinct central nervous system regions. Different publications such as "An Argument for Basic Emotions," published in Cognition & Emotion (Taylor & Francis Press) by Paul Ekman in 1992, pages 169-200 and "Four Systems of Emotions Activation: Cognitive and Non-Cognitive Processes," Published in Psychological review by C. E. Izard in 1993, pages 68-90, describes the discrete emotion model. The mentioned concepts are experimented and proved by functional magnetic resonance imaging by Morris J. S. et al. and published their findings in "A Differential Neural Response in the Human Amygdala to Fearful and Happy Facial Expressions, this is" in Nature, pages 812-815 [1996].

SUMMARY OF THE INVENTION

To include all the facial image variations, a sequence of video frames ($c_1, c_2, \ldots, c_n$) is considered as an input and the output of the network is a binary number y. We propose a residual network with a Long Short-Term Memory (LSTM) layer on top of that to extract intra-class similarity and inter-class discriminatory of captured facial images from different video frames, in other words, the conditional probability of the output, $p(y|(c_1, c_2, \ldots, c_n))$. Temporal feature of a facial image in a frame is presented as an embedding vector. The embedding vector per identity is constructed through the residual network architecture consisting of residual blocks.

The general form of each block can be formulated as:

$$y_l = h(x_l) + F(x_l, (W_r, b_r)_l)$$

$$x_{(l+1)} = f(y_l)$$

where $x_l$ and $x_{l+1}$ are input and output of the lth unit, h is a forward function of the plain unit, F is a residual function, r stands for the number of repeated convolution layer in the residual function, and f is a differentiable threshold function. The initial idea of the present invention, ResNet, is to achieve additive residual function F with respect to $h_{(xl)}$ and to facilitate minimizing the loss function. In this regard, emphasize on the importance of the facial feature mapping, $h_{(xl)}=xl$, so in the general formula we denote on r to represent the repetition times of the convolutional layers in residual branch, and we follow the mapping for the plain branch. In residual block, the other noteworthy nob is differentiable threshold function. If f is also considered identify mapping, for any deeper unit L and shallower unit l:

$$x_L = x_l + \sum_{i=l}^{L-1} F(x_i, (W_r, b_r)_i)$$

This assumption turns the matrix-vector products, say:

$$x_L = \prod_{i=0}^{L-1} W_i x_0, \, b_i = 0$$

to the summation of the outputs of all preceding residual functions (plus x0), and consequently clean backpropagation formula:

$$\frac{\partial E}{\partial x_l} = \frac{\partial E}{\partial x_L} \frac{\partial x_L}{\partial x_l}$$
$$= \frac{\partial E}{\partial x_L}\left[1 + \frac{\partial \sum_{i=l}^{L-1} F(x_i, (W_r, b_r)_i)}{\partial x_L}\right]$$

One of the most interesting properties of this architecture is reducing the probability for the gradient to be canceled out. Refer back to the general form of the residual units, there are other residual units with the properties of increasing dimensions and reducing feature map sizes by using the conventional activation function, Rectified Linear Unit (ReLU), as the differentiable threshold function:

$$\frac{\partial E}{\partial x_l} = \frac{\partial E}{\partial x_L}\left[\frac{\partial x_L}{\partial h}\frac{\partial h}{\partial x_l} + \frac{\partial \sum_{i=l}^{L-1} F(x_i, (W_r, b_r)_i)}{\partial x_L}\right]$$

The last residual block maps a facial image into the embedding vector. FIG. 6 illustrates such a mapping for different facial images captured from a camera(s) in different angles and time windows. LSTM units have the ability to learn long range dependency from the input sequences. At the time step t, the behavior between input($x_t$), output($h_t$), and internal state is controlled through three gates. For each unit, $c_t$ stores the internal state, and three gates are input gate($i_t$), output gate($o_t$), and forget gate($f_t$), where W and b are model parameters, F is sigmoid function, and $g_t$ is the non-linear transformation of inputs, see FIG. 6. To capture the temporal relation from the video frames sequence which is importance for identity authentication, outputs and cell memories from last time step are connected to the three gates through defined dot products in:

$$i_t = \sigma(W_{xi}x_t + W_{hi}h_{t-1} + W_{ci}c_{t-1} + b_i)$$

$$f_t = \sigma(W_{xf}x_t + W_{hf}h_{t-1} + W_{cf}c_{t-1} + b_f)$$

$$o_t = \sigma(W_{xo}x_t + W_{ho}h_{t-1} + W_{co}c_{t-1} + b_o)$$

$$g_t = \text{PReLU}(W_{xg}x_t + W_{hg}h_{t-1} + b_g)$$

$$c_t = f_t \odot c_{t-1} + i_t \odot g_t$$

$$h_t = o_t \odot \text{PReLU}(c_t)$$

Inputs of the three gates consist of the current time step of the input and last time step of the output and internal memory. The cell memory is updated as a result of the combination of input gate ($i_t$) and forget gate (ft). The influence of the input in the internal state is controlled by input gate, and forget gate takes the control over the contribution of the last internal state to the current internal state.

Basic human emotions translate to a variety of facial muscle movements. It is often easy for humans to read basic emotions such as happiness, sadness, etc. from facial expressions. Teaching a neural network to classify between these basic emotions to match human level accuracy and beyond is a tedious task. The model should not only detect different sized faces, but also accurately generate emotion probabilities for the face. Mathematically, the temporal deep learning model attempts to solve an optimization problem on facial expression image database to find the optimal model over the selected training set to detect basic emotions. The model consists of several convolutional neural network layers with very large number of learnable parameters between the layers to extract various Action Unit (AU) features in the facial images and discover the hidden patterns in them. Action Units (AUs) are the fundamental actions of individual muscles or groups of facial muscles. They are classified as additive or non-additive AUs according to whether they occur in combination or not. In additive AUs, the combination does not change the appearance of other AUs present. The main goal of the proposed deep learning model is to provide the probability of the basic emotions for a real-time video as a single modal input and analyze their emotion trajectories. Teaching the neural network falls into the category of supervised learning in which the neural network is provided with actual data and ground truths to learn from. Thus, teaching the neural network becomes an optimization problem. The input layer accepts a streaming video with facial images, and the output layer generates eight (8) classes of emotions: anger, contempt, disgust, fear, happiness, natural, sadness, and surprise continuously for each frame in the video. Since the output generated depends upon a short span of time, this temporal model provides interesting advantages over other traditional machine learning methods.

A gaze tracking subsystem using video frames information computes special and temporal characteristics of eye movement to estimate user intent and attention. Gaze is estimated from the relative movement between the pupil center and glint positions and can be tracked actively. The objective is on estimating the orientation of the eyes with no or slight head movement. The direction of eye-gaze, including the head orientation is considered in this task.

Thus, what is needed is a system capable of reading streaming videos and audio, finding each user's faces from the videos and converting them to emotional attributes and general attentiveness levels, leading to the attentiveness and engagement of the whole group over time. The attentiveness of each user can be estimated by exploring emotional attributes and gaze estimation.

The present invention has a variety of uses including, but not limited to the following illustrative uses:

Connected cars and driver attention—When a person looks at cell phone or gets distracted during driving.
In store marketing and advertising—Advertising based on emotion and attention.
E-marketing—Computer based commerce or augmented/mixed reality commerce.
Video teleconferencing.
HR hiring and interview.
Customer engagement through video conferencing or teleconferencing.
Health care—pain and emotion Identification.
Smart community (such as stadium, airport, train station, . . . ) crowd emotion analysis—for cyber security applications.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIG. 2A and FIG. 2B illustrate a high-level diagram of multi-user face extraction and recognition from a video stream.

DETAILED DESCRIPTION

The present disclosure relates to a temporal neural network system capable of estimating the excitement and attentiveness of multiple users from streaming videos. The system is capable of detecting spontaneous facial expressions through time. Subtle facial expressions provide enormous insight on a person's behavior. A face detection neural network system is coupled with a temporal neural network emotion model applied to streaming videos and can model a person's behavioral pattern over time. This is crucial in understanding person's attentiveness and excitement. Overall, the system does the following—extracts multiple faces from a streaming video, finds specific emotions in each face (e.g. happiness, fear, anger, etc.), and also determines the degree of arousal and valence associated with each emotion. Thus, the affective computing system provides a comprehensive model for extracting a person's emotions, emotional behavior over time, and the degree of arousal and valence associated.

The term facial expression is defined as a distinctive change in the human face involving various facial muscle groups according to different situations or emotions. Facial Action Coding System (FACS) uses physical, visual changes in the face called action units (AUs) to encode facial expressions. FACS encoding can combine basic facial actions to represent complex human facial expressions. Each facial expression can have one or many AUs associated with it. Unique facial AUs are a result of one or more facial muscle movements. Thus, FACS in a high level is encoding subtle facial muscle movements into discrete action units. For example, AUs 1, 4, and 15 together correlate to a 'sad' emotion. In other words, the emotion 'sad' is encoded using FACS by combining AUs 1-Inner Brow Raiser, 4-Brow Lowered, 15-Lip Corner Depressor.

Figure 1:
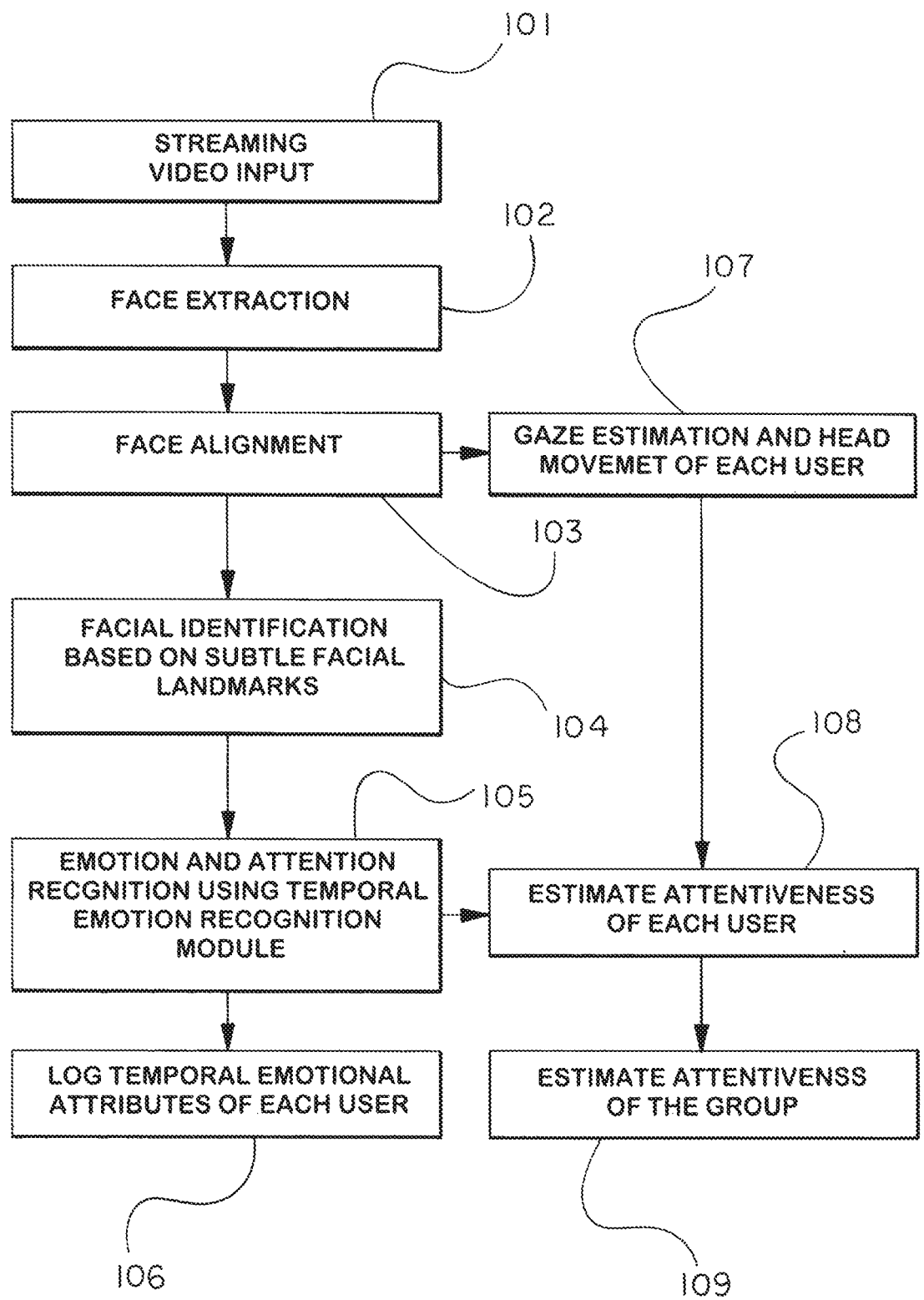
FIG. 1 illustrates the high-level topology of the temporal emotion model used for estimating user engagement and attentiveness using streaming video.

Steps 101 through 107 in FIG. 1 correspond to the overall pipeline of the temporal neural network system. Step 101 is a streaming video input from any traditional video sources such as webcam, CCTV camera, video files from internet, Internet of Things (IoT) devices, local video files, etc. Faces of each person in the streaming video are detected and extracted in Step 102. This is done by using cascaded scale-invariant convolutional neural networks (CNNs) trained on more than 50000 images and more than 3000 video clips of human faces. Outputs of Step 102 are bounding box location of each person's face in the video stream. No additional scaling or cropping is done to the extracted faces. Importance of face alignment on face emotion recognition is covered in the literature. Step 103 aligns the extracted faces in order to reduce the complexity of further algorithms down the pipeline.

Figure 2B:
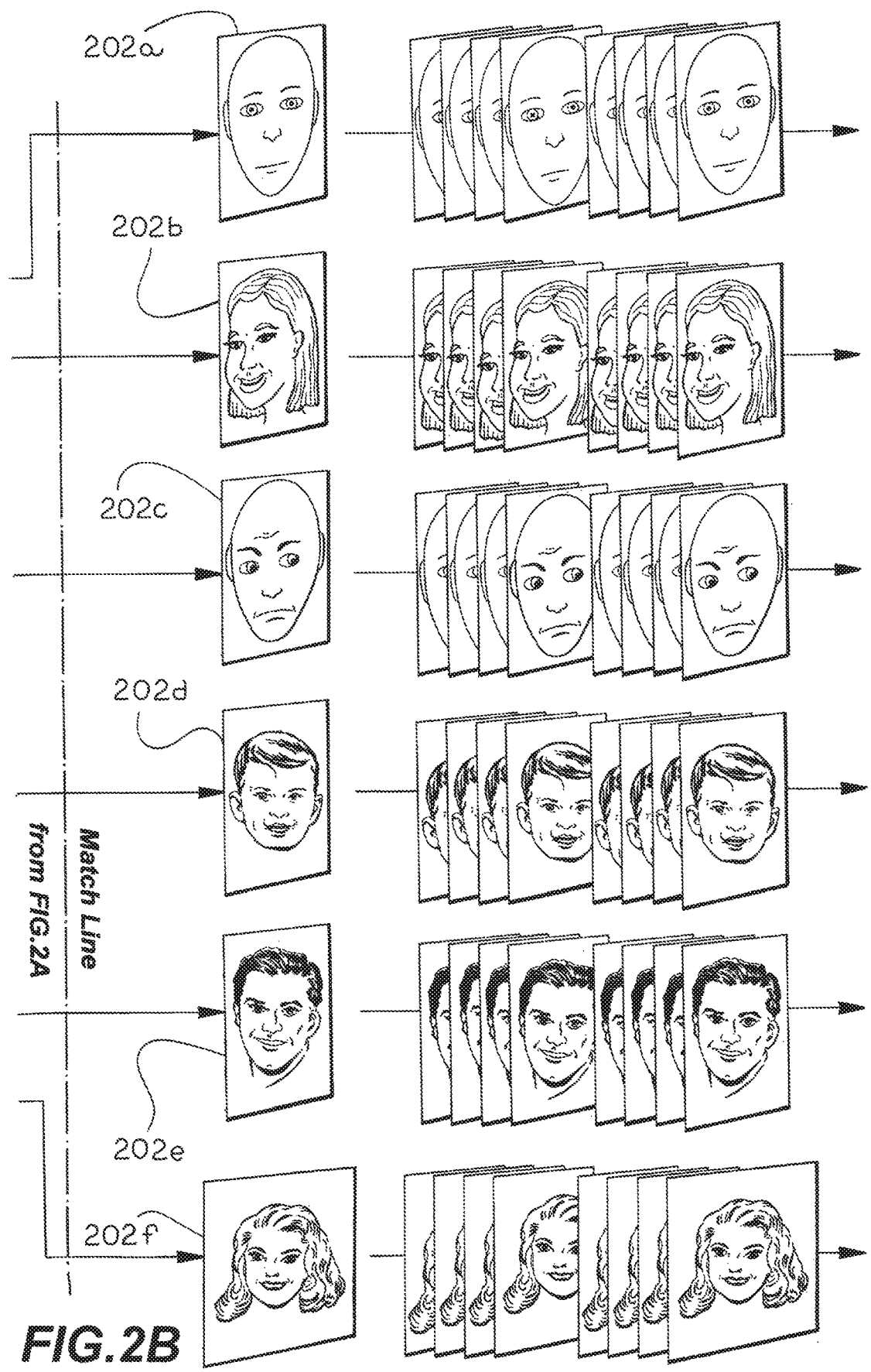
Figure 3:
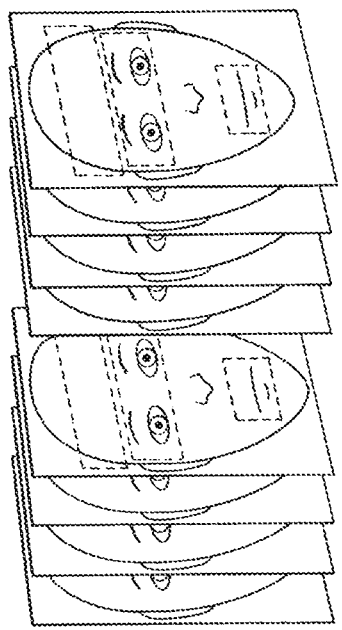
FIG. 3 illustrates a high-level diagram of facial action units (AUs) conversion module based on a neural network detection system.
Figure 3:
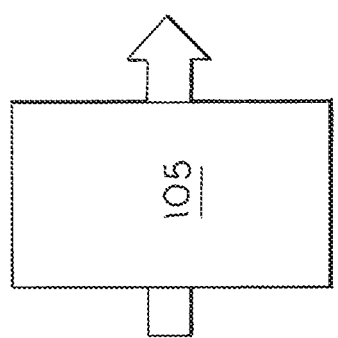
Figure 3:
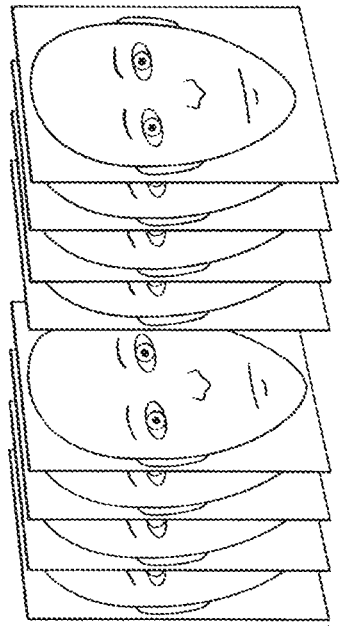

Step 104 in FIG. 1 corresponds to a scale-invariant facial identification system. The facial identification system provides a unique identifier (UID) for each face in the streaming video and enables tracking the faces using corresponding UID. Thus, the system has inherent knowledge of the people in the streaming video and their relative position. Hence, the system is capable of re-identifying the person even if the person moves out of frame, sits in a different seat, or walks in a different way than a few moments behind in time. The facial identification system provides the first step in associating temporal emotions on a per person basis and tracking the associated temporal emotions regardless of the position of the person in the frame. Step 104 is further illustrated in FIG. 2A. A streaming video frame 200 is processed at step 104 to produce extracted faces 202a-f. The individual extracted faces are then monitored over time to determine facial expressions for processing at step 105.

Figure 4:
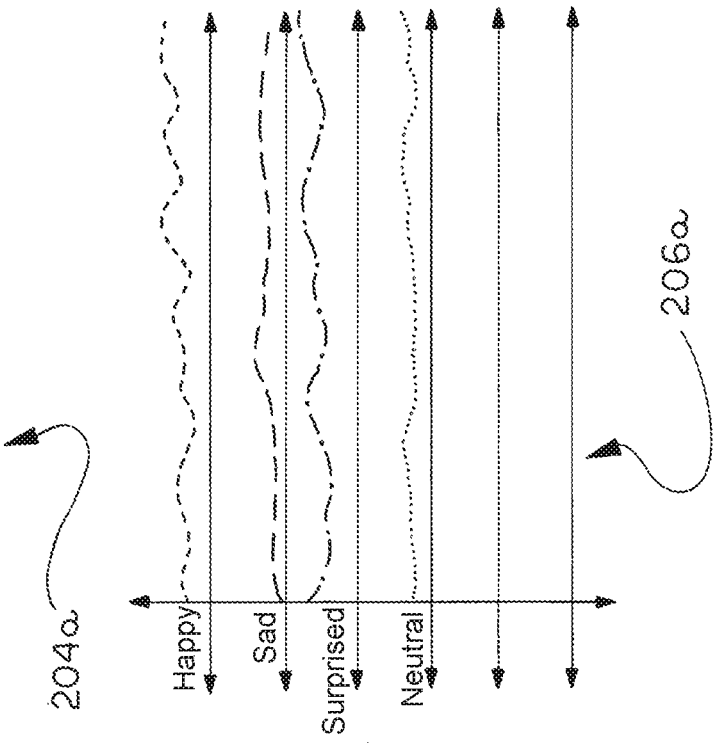
FIG. 4 illustrates a neural network based emotion classifier using the extracted AUs to estimate and display the valence and arousal maps associated with the input image.
Figure 4:
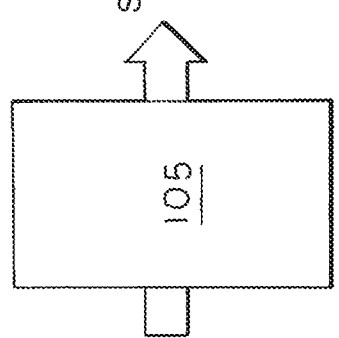
Figure 4:
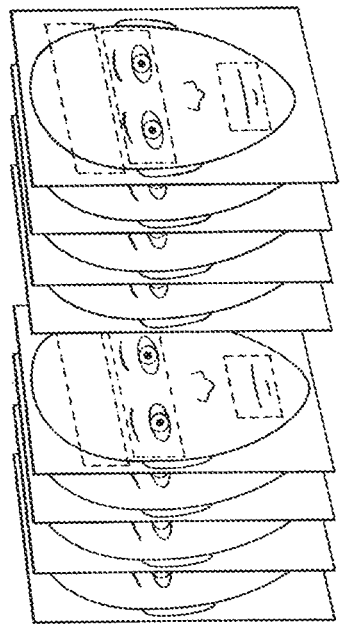
Figure 5:
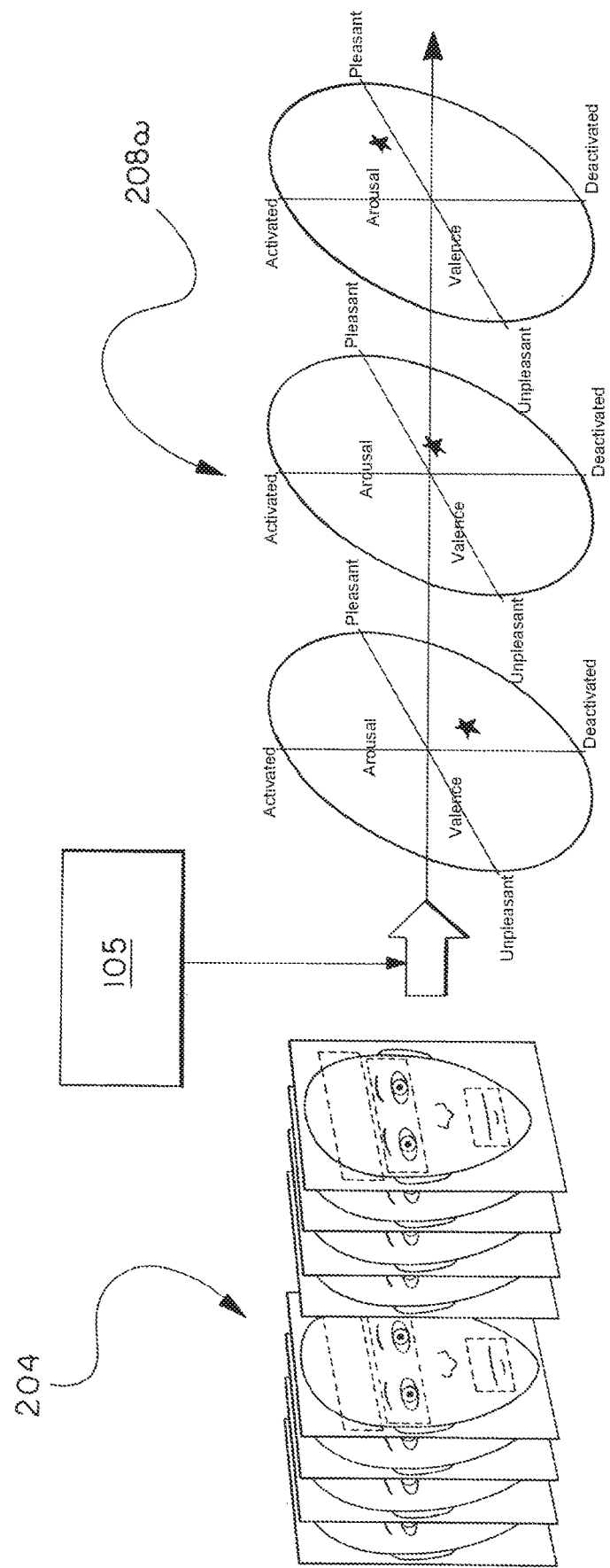
FIG. 5 illustrates the neural network based emotion classifier of FIG. 4 using the extracted AUs to estimate and display the valence and arousal maps associated with the input image.
Figure 6:
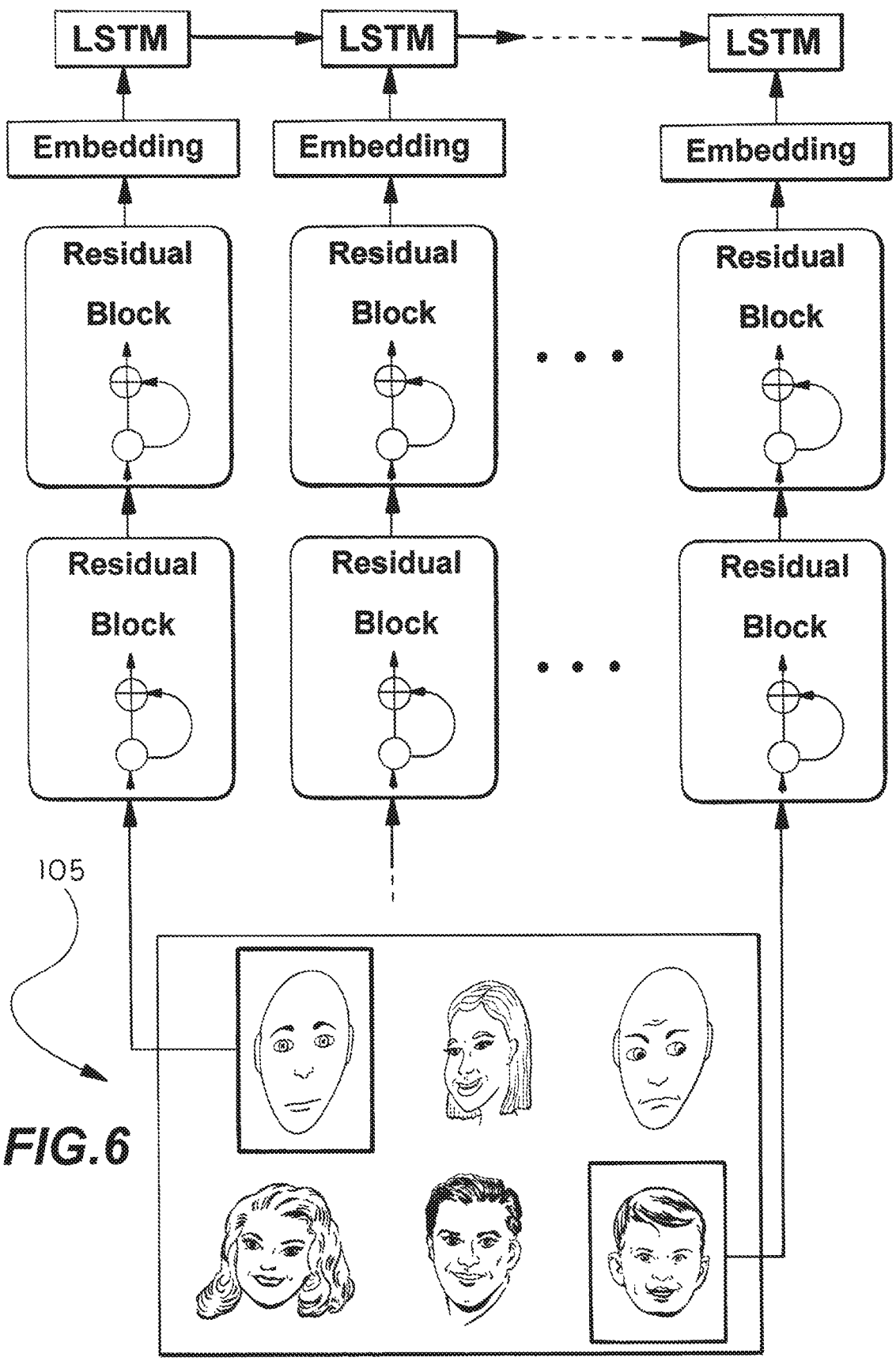
FIG. 6 illustrates the time sequence neural network based emotion and engagement classifier.

Step 105 in FIG. 1 corresponds to the temporal emotion recognition neural network module where macro and micro expressions from videos are spotted. Unlike conventional CNN based emotion classifier, the mentioned neural network module captures emotions over time and estimates the best possible emotional and behavioral attributes 204a by concatenating three methods: (1) by learning to represent raw input images to a set of distinct continuous emotion vectors, (2) by learning to represent extracted action units to a set of distinct continuous emotion vectors, and (3) by learning to represent extracted action units to quantitative values of valence and arousal. By doing so, the temporal neural network module outputs both a continuous set of emotional attributes such as happiness, sadness, etc. and a continuous stream of valence and arousal values 206a associated with each face in the streaming video (FIG. 4) or by continuous stream of valence and arousal measurements 208a associated with each face in the streaming video (FIG. 5).

In Step 106 in FIG. 1, the temporal attributes are logged either in memory, local storage, or cloud computing storage destinations. The information is available as tabular data which are queryable. The stored data consists of a timestamp of the capture, number of faces extracted, and attributes extracted for each face. This database provides a treasure trove of information and can be used for various data analytic tasks, such as finding the number of users attended, general emotional orientation of the group of users, etc.

Figure 7:
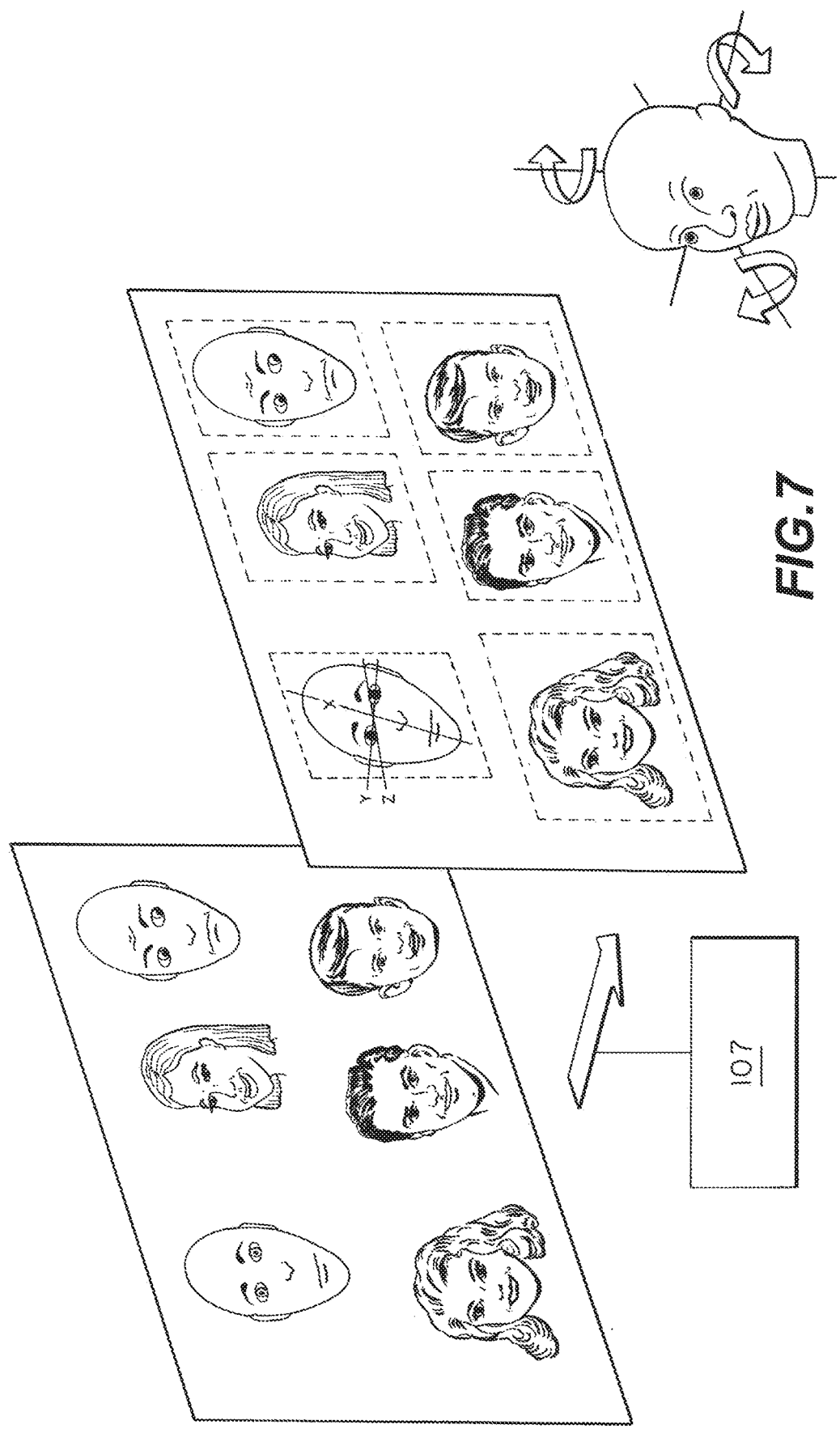
FIG. 7. Illustrates eye-gaze and head direction, orientation, and movement tracking for a video stream.

Step 107 uses as input the output of Step 103 and estimates the direction of sight or gaze of each face and head movement in the streaming video (FIG. 7). Gaze estimation is done by training a neural network classifier on images of the eye looking at different directions. Once the gaze or direction of sight is estimated, merging its results with the emotional attributes of corresponding person gives insights into the attentiveness of each user. This is done in Step 108. Attentiveness of a person, in context to the current work, refers to the amount of attention one puts into the task at hand. Because the correlation between gaze and emotions to attentiveness is subjective according to the activity, for example a lecture hall or team meeting, gaze is treated as a tunable parameter according to the scenario. In Step 109, the attentiveness of the group (characterized by the binary number y) is estimated by combining individual attentiveness derived from Step 108.

We claim:

1. A machine learning method for real-time evaluating engagement and attentiveness of a group of multiple persons, comprising the steps of:
   a. preparing a streaming video of the multiple persons in the group:
   b. extracting face images of the multiple persons by:
      i. identifying face images using a trained neural network;
      ii. bounding each face image; and
      iii. assigning an identifier to each face image;
   c. recognizing micro and macro facial expressions in the face images using a temporal emotion recognition module to recognize emotions in the face images by concatenating (1) learning to represent raw input images as a set of distinct continuous emotion vectors, (2) learning to represent extracted action units as a set of distinct continuous emotion vectors, and (3) learning to represent extracted action units as quantitative values of valence and arousal; and
   d. from the recognized emotions in the face images estimating—the attentiveness of the group in real time.

2. The method of claim 1, wherein the method further includes determining the gaze of the face images and using the determined gaze to further estimate the attentiveness of the group.

3. The method of claim 2, wherein the method further includes determining the head trajectory of the face images and using the determined head movement to further estimate the attentiveness of the group.

4. An apparatus for implementing deep learning (DL) with respect to emotion characteristics of an individual, comprising:
   a. a graphical processing unit (GPU);
   b. a storage component configured to store types of emotions based on facial expressions of the individual;
   c. an emotion detection component operative on the GPU to identify at least one emotion type associated with at least one detected emotion characteristic and to store the identified emotion type in the storage component; and
   d. an application programming interface (API) component operative on the GPU for implementing temporal DL to receive a request from one or more applications for engagement level and, in response to the request, the API concatenates (1) learning to represent raw input images as a set of distinct continuous emotion vectors, (2) learning to represent extracted action units as a set of distinct continuous emotion vectors, and (3) learning to represent extracted action units as quantitative values of valence and arousal thereby identifying engagement level, the one or more applications operative on the GPU to identify content for display based upon the identified emotion and engagement type.

5. The apparatus of claim 4, the content including one or more of mobile photos, mobile videos, or camera video stream.

6. The apparatus of claim 4, further comprising:
   e. a calibration component operative on the GPU to:
      i. receive a request to calibrate emotion and engagement detection;
      ii. present a type of emotion and level engagement to a user;
      iii. utilize an imaging component to detect emotion characteristics; and
      iv. store an association between the presented type of emotion, engagement level and the detected emotion characteristics in the storage component.

7. The apparatus of claim 4, further comprising an imaging component operative on the GPU to detect emotion characteristics based upon one or more triggers received from one or more Internet of Things (IoT) devices.

* * * * *